US010317765B2

(12) United States Patent
Luten et al.

(10) Patent No.: US 10,317,765 B2
(45) Date of Patent: Jun. 11, 2019

(54) REDUCING DIFFRACTION EFFECTS ON AN ABLATED SURFACE

(71) Applicant: Gentex Corporation, Zeeland, MI (US)

(72) Inventors: Henry A. Luten, Holland, MI (US); Donald L. Bareman, Zeeland, MI (US); Thomas J. Scott, Belmont, MI (US); Kurtis L. Geerlings, Zeeland, MI (US); William L. Tonar, Holland, MI (US); Niels A. Olesen, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/620,385

(22) Filed: Jun. 12, 2017

(65) Prior Publication Data

US 2017/0277009 A1    Sep. 28, 2017

Related U.S. Application Data

(63) Continuation of application No. 14/922,047, filed on Oct. 23, 2015, now Pat. No. 9,703,166.

(60) Provisional application No. 62/068,140, filed on Oct. 24, 2014.

(51) Int. Cl.
| | |
|---|---|
| *G02F 1/153* | (2006.01) |
| *B23K 26/361* | (2014.01) |
| *B23K 26/362* | (2014.01) |
| *B23K 26/04* | (2014.01) |
| *B23K 26/57* | (2014.01) |
| *B23K 26/352* | (2014.01) |

(52) U.S. Cl.
CPC .......... *G02F 1/1533* (2013.01); *B23K 26/048* (2013.01); *B23K 26/355* (2018.08); *B23K 26/361* (2015.10); *B23K 26/362* (2013.01); *B23K 26/57* (2015.10)

(58) Field of Classification Search
CPC ... B23K 26/048; B23K 26/362; G02F 1/1533; B29C 59/16
USPC .......... 359/265–275, 900; 264/1.1, 1.34, 2.7
See application file for complete search history.

(56) References Cited

U.S. PATENT DOCUMENTS

| | | |
|---|---|---|
| 5,057,974 A | 10/1991 | Mizobe |
| 8,582,208 B2 | 11/2013 | Van Den Berg |
| (Continued) | | |

FOREIGN PATENT DOCUMENTS

| | | |
|---|---|---|
| JP | S57-022232 A | 2/1982 |
| JP | 2006-171585 A | 6/2006 |
| (Continued) | | |

OTHER PUBLICATIONS

Extended European Search Report for EP application 15853161.6 dated Nov. 9, 2017 (7 pages).

(Continued)

*Primary Examiner* — Tuyen Tra
(74) *Attorney, Agent, or Firm* — Foley & Lardner LLP; Bradley D. Johnson

(57) ABSTRACT

A method for removing a material from a surface includes passing a laser through a lens such that the laser impinges on the material. The surface from which the material is removed has an array of artifacts thereon with a spacing between the artifacts and a pitch between lines of the artifacts. At least the spacing between the artifacts is varied.

20 Claims, 18 Drawing Sheets

(56) References Cited

U.S. PATENT DOCUMENTS

| | | | |
|---|---|---|---|
| 2002/0145797 A1* | 10/2002 | Sales | G02B 3/0043 359/456 |
| 2007/0179481 A1 | 8/2007 | Frangineas et al. | |
| 2011/0248164 A1 | 10/2011 | Straw et al. | |
| 2012/0241788 A1 | 9/2012 | Carey et al. | |
| 2013/0081951 A1 | 4/2013 | Hankey et al. | |

FOREIGN PATENT DOCUMENTS

| | | |
|---|---|---|
| JP | 2011-253107 A | 12/2011 |
| RU | 2420379 C1 | 6/2011 |
| WO | WO-2014/066832 A1 | 5/2014 |

OTHER PUBLICATIONS

International Search Report and Written Opinion of the International Search Authority dated Feb. 11, 2016, from related application PCT/US2015/057246.
Non-Final Rejection Office Action on U.S. Appl. No. 14/922,047 dated Aug. 30, 2016.
U.S. Appl. No. 14/874,263, filed Oct. 2, 2015 (33 pages).

* cited by examiner

~10 nm

REDUCING DIFFRACTION EFFECTS ON AN ABLATED SURFACE

CROSS-REFERENCE TO RELATED PATENT APPLICATIONS

This application is a Continuation of U.S. patent application Ser. No. 14/922,047, filed Oct. 23, 2015, which claims the benefit of and priority to U.S. Provisional Patent Application No. 62/068,140, filed Oct. 24, 2014, both of which are incorporated herein by reference in their entireties.

TECHNICAL FIELD

The present disclosure generally relates to laser ablation processes and products produced thereby.

BACKGROUND

A laser ablation process generally includes selective removal of material at a surface of a workpiece by directing a laser beam at the workpiece. The laser beam is configured to deliver a controlled amount of energy at a laser spot defined where the beam impinges the desired surface. This controlled amount of energy is selected to liquefy, vaporize, or otherwise rapidly expand the surface material at the laser spot to cause it to separate from the workpiece for removal. Laser ablation can be used to remove at least a portion of one or more coatings from a coated substrate.

A conventional laser ablation process is typically performed at the focal height or distance of the objective (focusing) optics—i.e., with the focal plane of the laser beam at or near the surface from which material is to be removed. This gives the highest energy density and the smallest change in spot size with changes in the height of the surface. It has been found that with some conventional focused laser ablation processes, such as removing chromium (Cr) from glass with a picosecond green (532 nm) pulsed laser, the glass sustains surface damage to such an extent and with a regular periodicity that a diffraction grating is formed. Diffraction patterns that are produced by the diffraction grating can be an unwanted or unintended artifact of the ablation process.

The regular periodicity of the surface damage thought to be responsible for the diffraction grating is related to the laser pulse frequency and the scan speed. For example, at a 400 kHz pulse frequency and a 20 m/s scan speed, the spacing from pulse to pulse on the surface is 50 µm. A regular pattern of structures on a surface can generate diffraction according to the formula:

$$d(\sin \theta_m + \sin \theta_i) = m\lambda,$$

where d is the spacing of the pattern, $\theta_m$ and $\theta_i$ are the respective angles of the reflected and incident beams, m is the order of diffraction, and $\lambda$ is the wavelength of light diffracted under those conditions. The diffraction observed for the laser ablated surface may require point light source illumination to be visible. The effect is pictographically shown in Figure A.

As depicted in Figure A, Ray A (center of grating surface) is reflected at an angle equal to its incident angle (specular reflection). An observer sees this as the reflection of the light source. Rays B and C are diffracted from the grating surface, and their incident and resultant angles are not equal. These rays may represent the first order diffraction for a particular wavelength. Because the observer is generally focusing on the image plane of the light source, the diffracted beams appear as spots or bars of color on both sides of the light source as depicted by D and E. For clarity, the example shown in Figure A demonstrates diffraction in one dimension, but actual diffraction artifacts may be multidimensional.

A microscope image of a laser ablated surface produced in an ablation process with a constant laser pulse frequency that may produce a diffraction pattern is shown in FIG. 2. Diffraction patterns produced by laser ablated surfaces may be objectionable to individuals observing the laser ablated surfaces.

SUMMARY

One embodiment relates to a method for removing a material from a surface. The method includes passing a laser through a lens such that the laser impinges on the material. The surface from which the material is removed has an array of artifacts thereon with a spacing between the artifacts and a pitch between lines of the artifacts. At least the spacing between the artifacts is varied.

Another embodiment relates to a product. The product includes a substrate. The substrate has a first surface and an opposing second surface having an array of artifacts thereon with a spacing between the artifacts and a pitch between lines of the artifacts. At least one of the spacing between the artifacts or the pitch between the lines of the artifacts varies.

Another embodiment relates to a method for removing a material from a substrate. The method includes providing the substrate having a first surface and an opposing second surface. The material is disposed on the opposing second surface of the substrate. The method further includes impinging a laser on the material to remove the material from the substrate. The laser passes through the first surface and the opposing second surface before impinging on the material. The opposing second surface from which the material is removed has an array of artifacts thereon with a spacing between the artifacts and a pitch between lines of the artifacts. At least one of the spacing between the artifacts or the pitch between lines of the artifacts is varied.

Another embodiment relates to a method of removing a material from a surface. The method includes passing a laser through a lens, and impinging the laser on the material. A working distance between the lens and the material is different than a focal length of the lens. The working distance may be less than 80% of the focal length. The surface from which the material is removed may not exhibit an objectionable diffraction effect after the material has been removed. The surface from which the material is removed may exhibit a diffraction severity of less than 5 after the material has been removed. The surface from which the material is removed may exhibit a periodic structure after the material has been removed. The laser may pass through the surface before the laser impinges on the material to be removed.

Another embodiment relates to an electrochromic assembly including an element produced according to the above method.

Another embodiment relates to a method of removing a material from a surface. The method includes passing a laser through a lens, and impinging the laser on the material. The surface from which the material is removed has an array of artifacts thereon with a spacing between artifacts and a pitch between lines of artifacts, and at least one of the spacing and pitch is varied. At least one of the spacing and pitch may be random or pseudo-random. The pitch may be between 60 µm and 200 µm. The artifacts may each have a characteristic radii, and at least a portion of the artifacts may have different characteristic radii. A working distance between the lens and the material may be different than a focal length of the lens. The method may further include varying a pulse frequency of the laser, such that a variation in the spacing of pulses incident on the material is produced. The method may further include varying a scan speed of the laser over the material, such that a variation in the spacing of laser pulses incident on the material is produced. The lens may be a variable lens, and the method may further include modulating the focal length of the lens. The method may further include driving an actuated mirror located along a beam path of the laser, such that a variation in a spacing of laser pulses incident on the material is produced. The surface from which the material is removed may not exhibit an objectionable diffraction effect after the material has been removed. The surface from which the material is removed may exhibit a diffraction severity of less than 5 after the material has been removed. The laser may pass through the surface before the laser impinges on the material to be removed.

Another embodiment relates to an electrochromic assembly comprising an element produced according to the above process.

BRIEF DESCRIPTION OF THE DRAWINGS

Illustrative embodiments will hereinafter be described in conjunction with the appended drawings, wherein like designations denote like elements.

DETAILED DESCRIPTION

Figure 1:
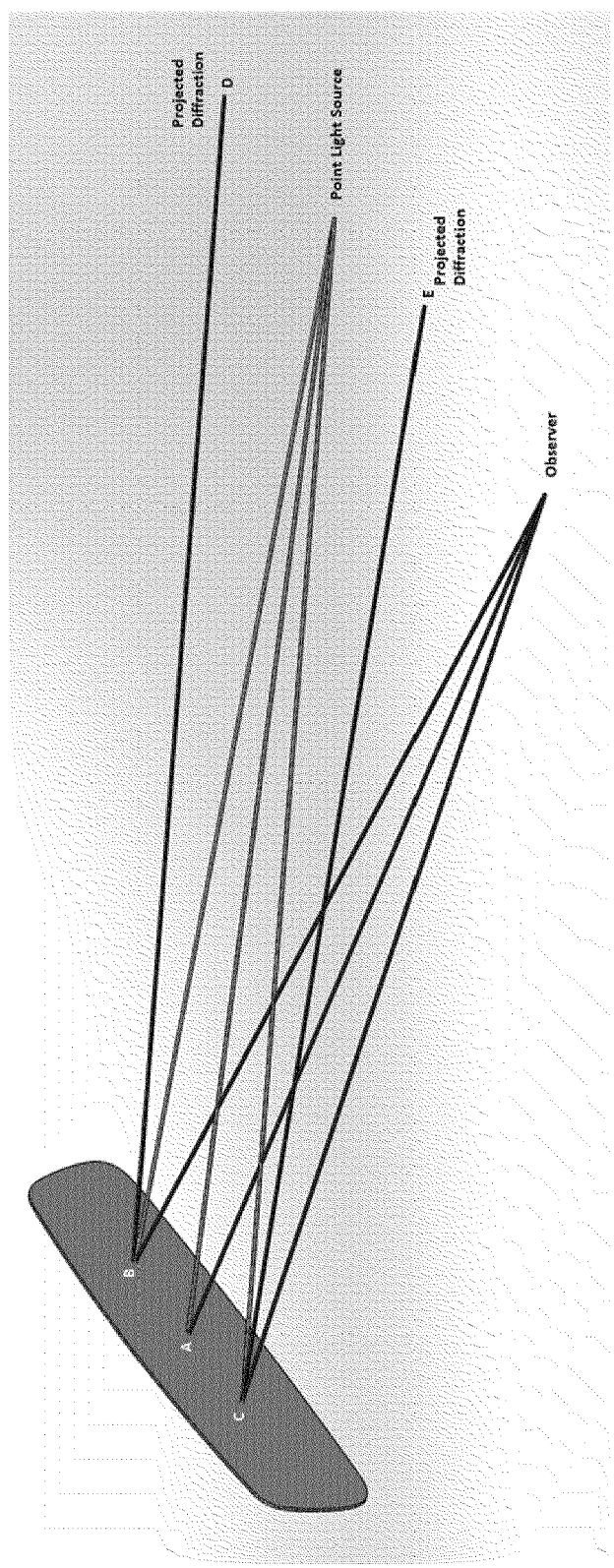
FIG. 1 is a schematic representation of diffraction produced by a point light source.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Described herein are methods for reducing the appearance of diffraction patterns associated with a laser ablation process. The methods are directed to reducing the amount of damage imparted to the surface and altering the arrangement of the artifacts produced on the surface as a result of the ablation process, such that the diffraction produced by the surface is reduced. The methods directed to reducing the damage to the surface produce artifacts with a decreased height, such that the amount of diffraction produced is reduced or eliminated. The methods directed to producing an irregular artifact arrangement alter the diffraction pattern produced, such that a greater number of diffraction spots are produced, each having a reduced intensity. Stated differently, an irregular arrangement of artifacts on the surface may produce a more disperse diffraction pattern. Observers may find a surface that produces reduced or more disperse diffraction less objectionable, and consequently preferable.

The methods of reducing the appearance of diffraction patterns may be combined, such that a single laser ablation method is modified to reduce the damage imparted to the surface and produce an irregular arrangement of artifacts on the surface.

A method for reducing the damage to the surface of the ablated region includes reducing the intensity of the laser spot utilized in the ablation process. An exemplary method of reducing the intensity of the laser spot includes laser ablation performed with the beam out of focus—i.e., with the focal plane of the laser beam spaced apart from the surface from which the material is to be removed. In other words, the working distance between a lens focusing the laser beam and the target surface is different than the focal length produced by the lens. In one embodiment, the surface from which material is to be removed is above focus, with the focal plane of the laser beam located beyond the removal surface in the direction of laser propagation as shown in FIG. 3.

Figure 3:
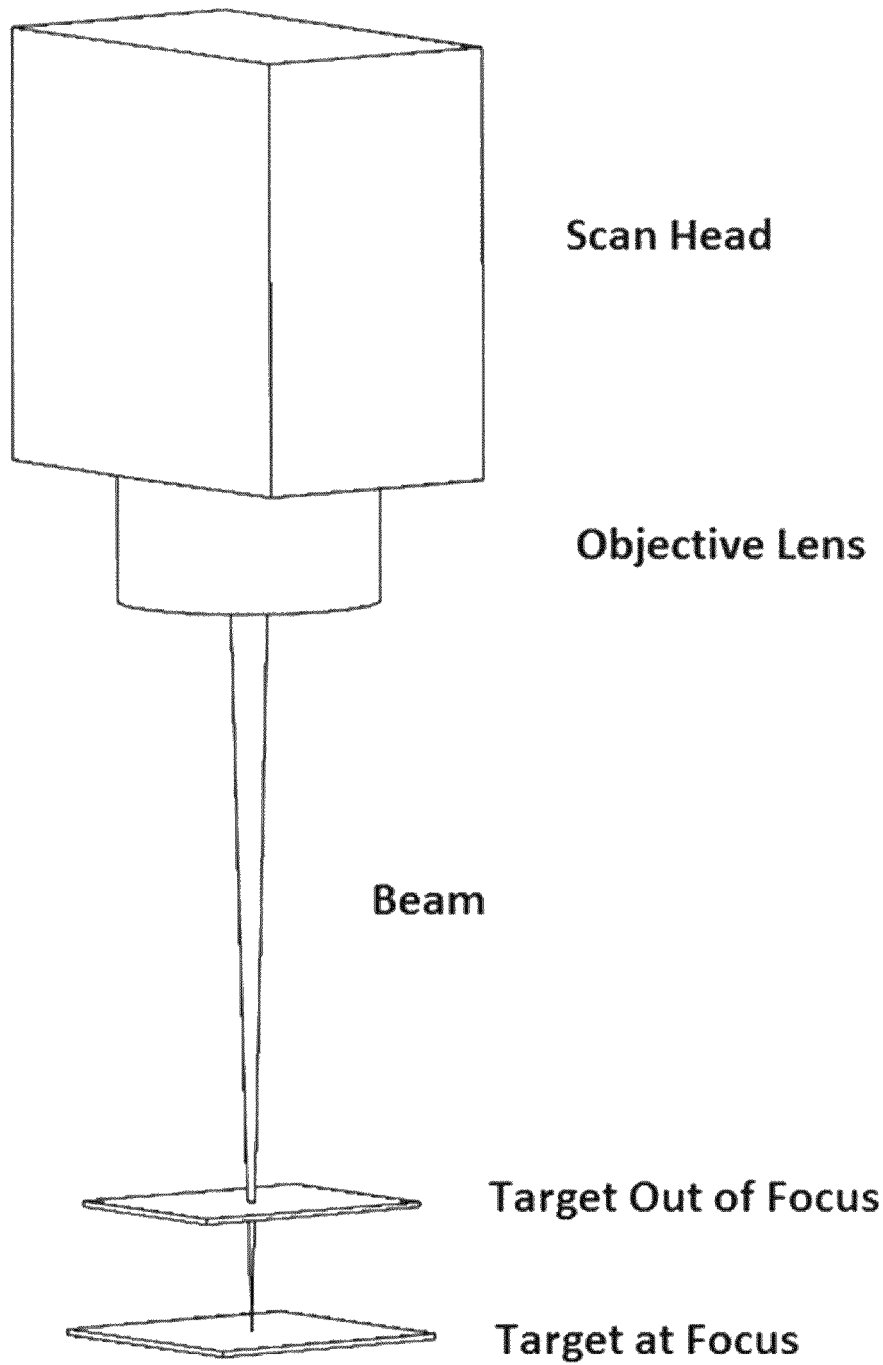
FIG. 3 is a schematic depiction of an out of focus laser ablation system.
Figure 4:
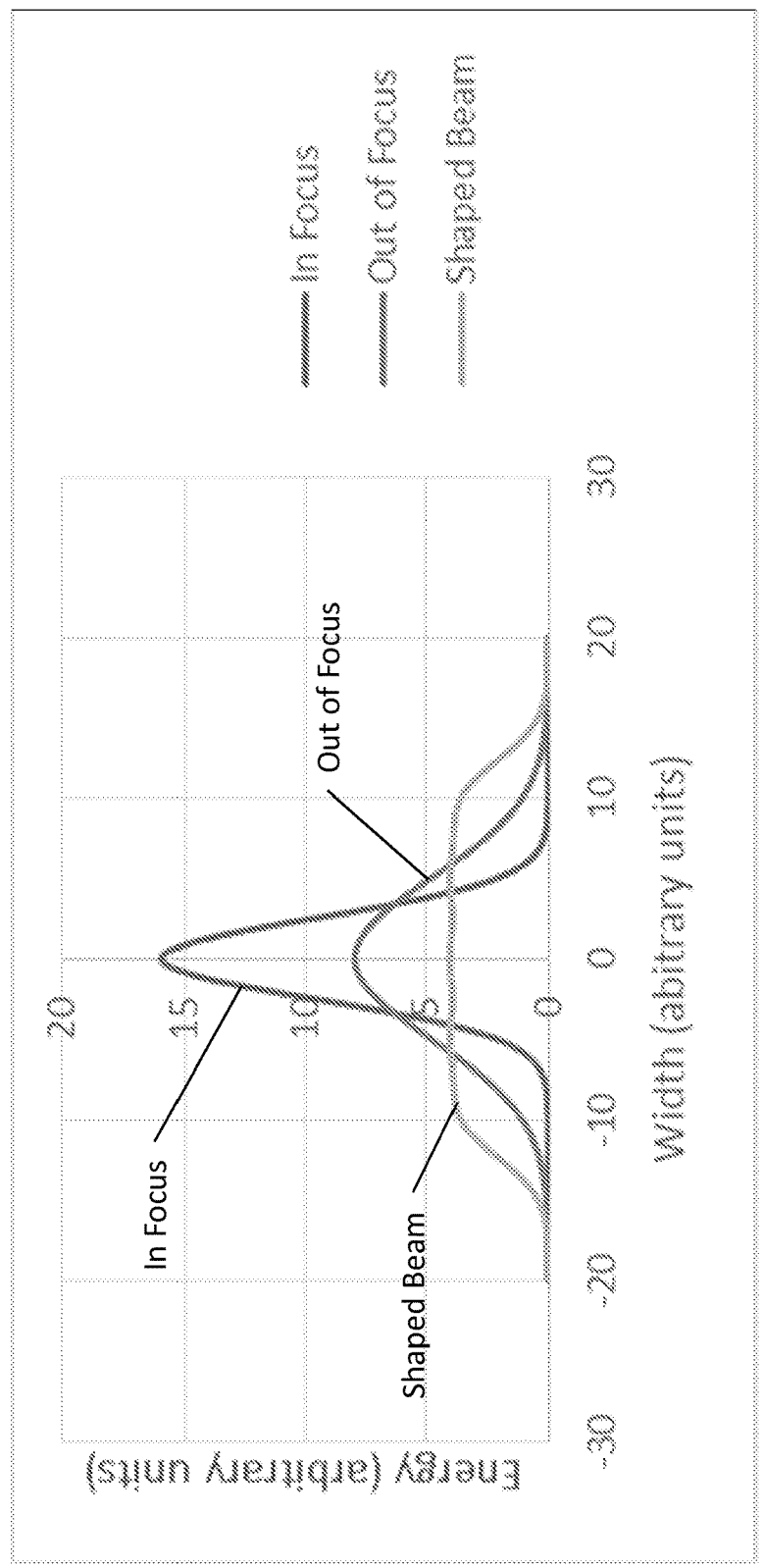
FIG. 4 depicts the energy of a laser spot as a function of spot width for an in focus, out of focus and shaped beam system.

The arrangement shown in FIG. 3 has the effect of increasing the spot size and reducing the magnitude of the peak in the energy profile of the spot, as illustrated in FIG. 4. The reduction of magnitude of the peak in the energy profile of the spot reduces the amount of damage imparted to the surface during the laser ablation process, thereby reducing the height of the artifacts produced. In this manner, out of focus laser ablation can reduce the intensity of an observed diffraction pattern. The focal distance or working distance of the laser ablation system can be adjusted or optimized to produce artifacts with different heights. According to some embodiments, the height of the diffraction artifacts on the surface may be such that the resulting diffraction pattern is not discernible to the naked eye.

An out of focus ablation process provides the benefit of reducing the energy profile of the focused laser spot and expanding the size of the laser spot on the target surface without modifying the hardware of the ablation system. Thus, a laser with the same power may be utilized to produce laser spots with different sizes and energies by changing the working distance without changing the optical elements of the ablation system. This ability reduces the cost associated with changing the laser spot size and energy profile.

The out of focus ablation process may include any appropriate working distance to focal length ratio. According to one embodiment, the out of focus ablation process may employ a working distance that is 99% or less of the focal length of the system, such as a working distance that is 95% or less, 75% or less, or 50% or less of the focal length of the system. For example, in a 550 mm focal length system, the target surface may be spaced apart from the focal plane of the laser ablation system by at least 5 mm, such as at least 50 mm, at least 100 mm, or more.

The reduced energy profile of the focused laser spot can also be achieved through the use of beam shaping optics. Diffractive or refractive beam shaping optics can be used to flatten the energy profile of the spot. Flattening the spot substantially removes the hot spot from the center of the ablated spot, reducing the surface damage. The overlap of the pulses may also be reduced, such as by changing the spacing or shape of the pulses, thereby reducing the surface damage caused by the overlapping regions of the pulses.

Figure 2:
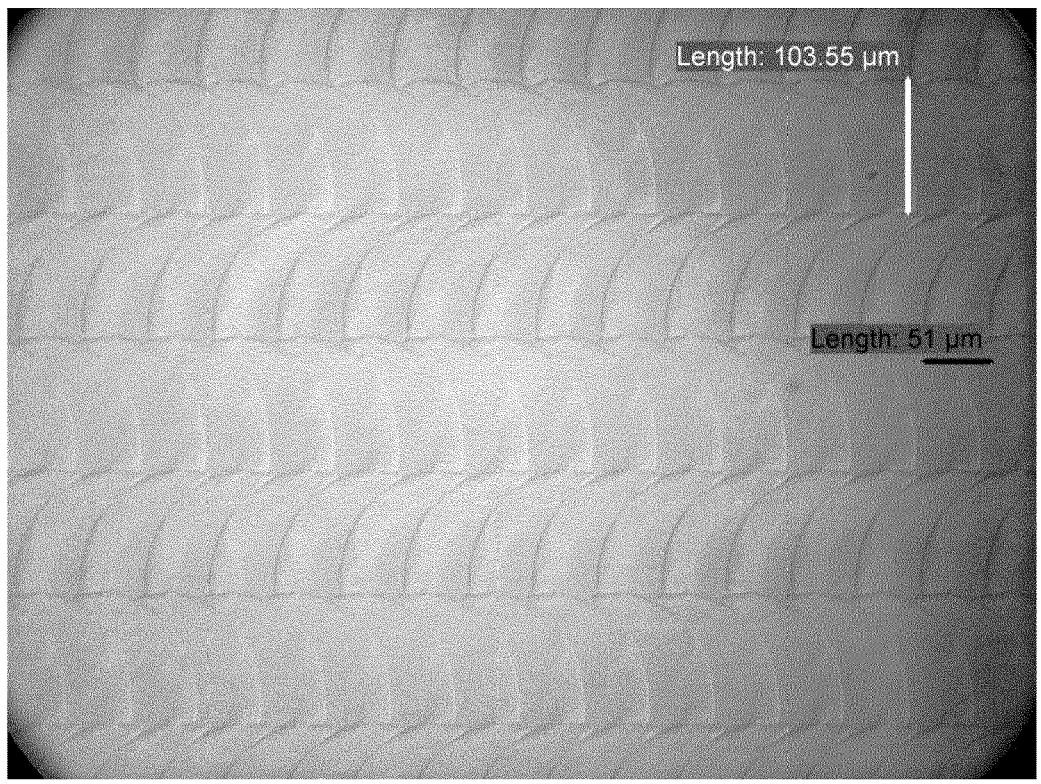
FIG. 2 is a microscope image of a laser ablated surface.
Figure 5:
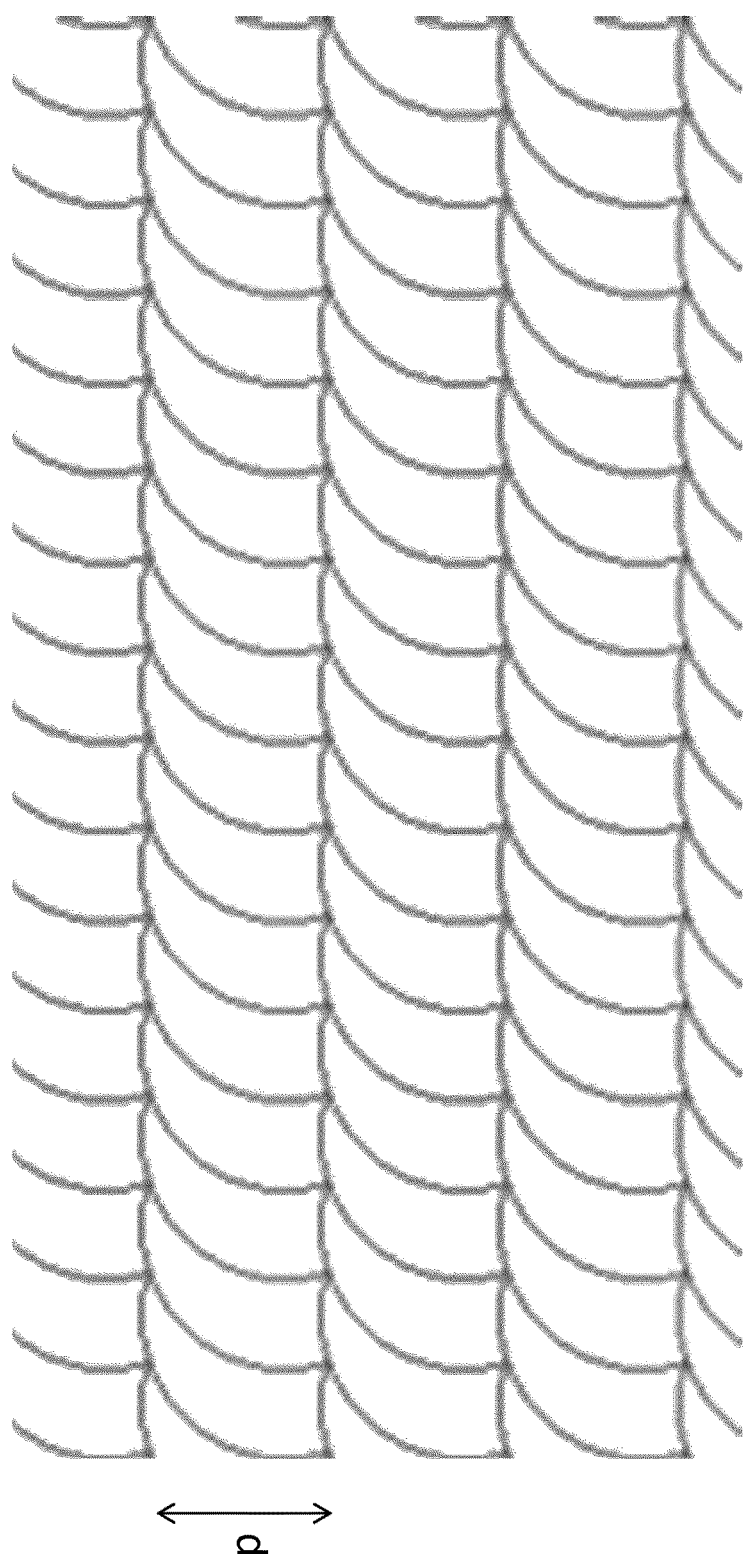
FIG. 5 is a schematic representation of surface artifact structure produced by a laser ablation process.

A computer generated image of the laser footprint produced on the substrate, based on the laser and scan head settings used to ablate material from the surface in the above microscopic image, is illustrated in FIG. 5. The pattern illustrated in FIG. 5 is based on a 160 µm ablated spot, 400 kHz laser pulse frequency, a scan speed of 20 m/s (in the horizontal direction of the image), and a 100 µm pitch, p, (in the vertical direction of the images) between scan lines. The laser footprint shown in FIG. 5 is produced by an ablation process that sweeps in a single direction. Other ablation processes may sweep in alternating scan directions, back and forth scanning, producing a surface structure of the type shown in FIG. 2.

Figure 6:
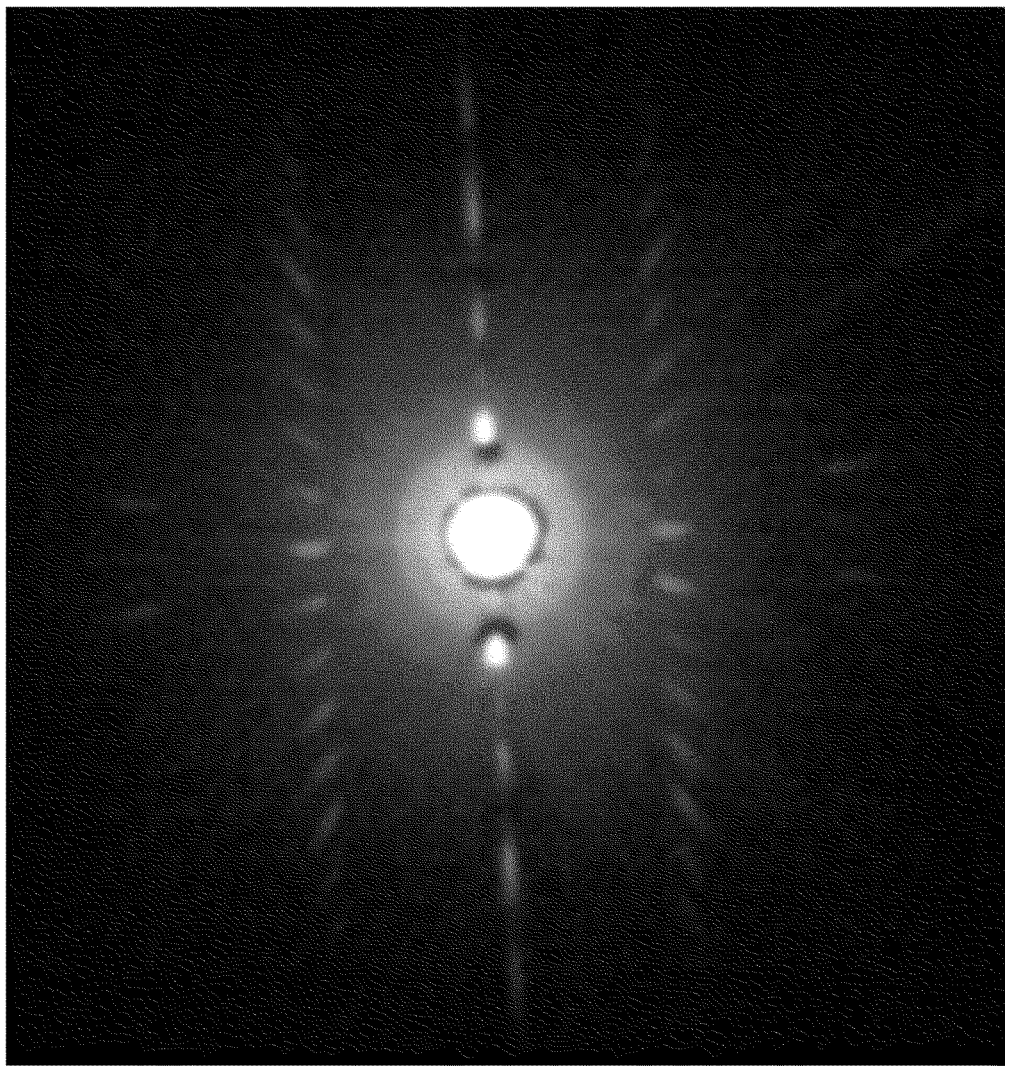
FIG. 6 is a diffraction pattern produced by an asymmetric surface structure.
Figure 7:
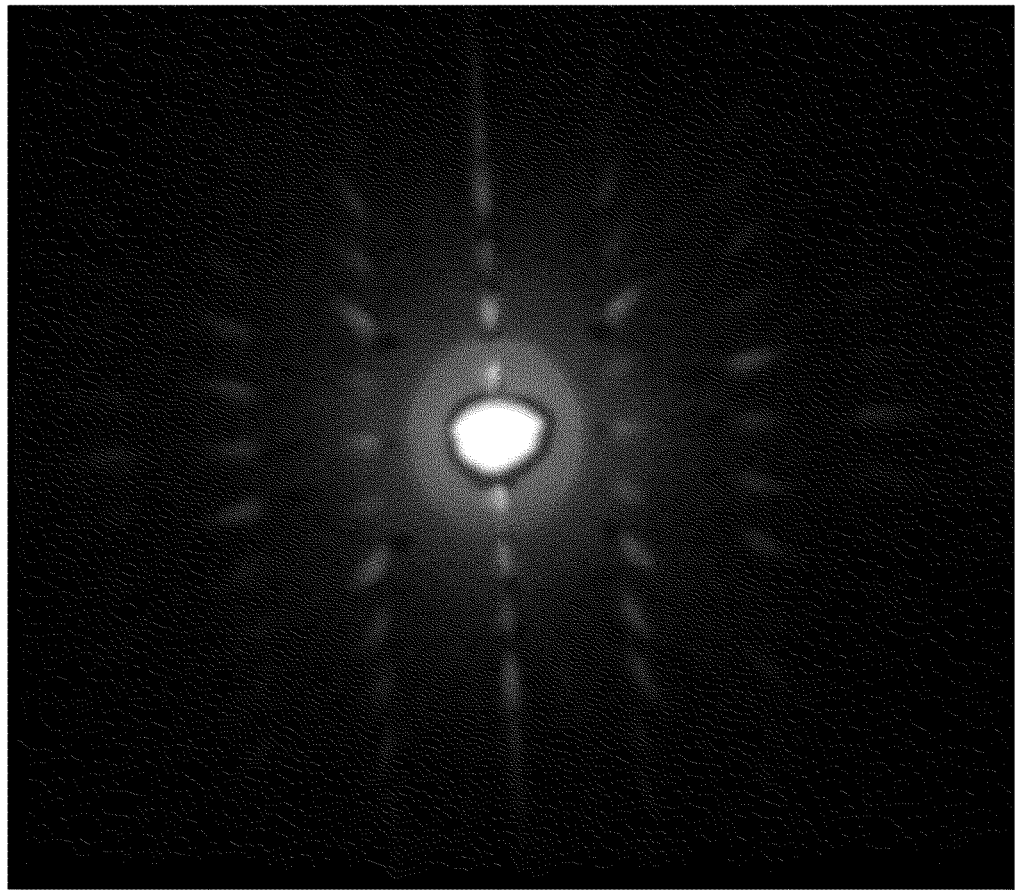
FIG. 7 is a diffraction pattern produced by a symmetric surface structure.

For the process conditions described above it is believed that the 50 micron step size in the back-and-forth scanning direction generates the most largely spaced component of the diffraction pattern. The 100 micron line pitch between adjacent scan lines can also generate a diffraction pattern, but its spacing is much smaller than that of the 50 micron pattern. While any regular or periodic pattern is capable of generating a diffraction grating, the relative intensity of any resulting diffraction is a function of the size and/or shape of the feature generating it. The pulse step and line pitch components can generate objectionable diffraction artifacts for different scan settings. The asymmetry of the 50 um step and the 100 um pitch produces diffraction which appears as lines, which are tight groupings of diffraction spots. This effect is due to the 100 um pitch spacing generating smaller angles of diffraction than the 50 µm step spacing, which causes groups of diffraction spots to appear like lines. A diffraction pattern including such diffraction lines produced from a surface pattern with an asymmetric step and pitch is shown in FIG. 6. A surface produced by a symmetrical or substantially symmetrical scan pattern, where the step size and pitch size are identical or substantially identical, produce a grid-like pattern of diffraction spots. FIG. 7 illustrates a diffraction pattern produced by a scan pattern that is more symmetrical than the scan pattern of FIG. 6.

Decreasing or eliminating observable diffraction may be achieved by decreasing or substantially eliminating the surface structures that create the diffraction grating. For example, the ablation process may be configured such that there is no resulting surface damage or such that the surface damage is reduced to a level at which any resulting diffraction grating—i.e., the periodic pattern of surface structures or damage—does not cause enough diffraction of point source light to be noticeable. However, completely eliminating such surface features is not always possible or practical. The method of reducing damage to the surface described above may be employed to reduce or eliminate the surface artifacts produced by the ablation process.

The reduction of the damage produced by the ablation process reduces the size, depth, of the artifacts produced by the ablation process. The surface structure size and shape, lateral size, have been successfully altered in a way that reduces the intensity of any diffraction caused by the resulting diffraction grating. In one particular implementation of this method, noted above, laser ablation is performed with the beam out of focus—i.e., with the focal plane of the laser beam spaced from the surface from which the material is to be removed. This unfocused laser ablation technique can successfully modify the surface damage and the resulting diffraction grating, compared to that produced by a focused laser beam, such that the diffraction caused by the ablated surface is not objectionable. The repeating periodic surface features produced by the ablation process are still present, but the observed diffraction can be greatly reduced and/or virtually eliminated. The reduction in the observed diffraction may be sufficient to render the diffraction unobjectionable, despite the presence of the periodic surface structure.

Figure 8A:
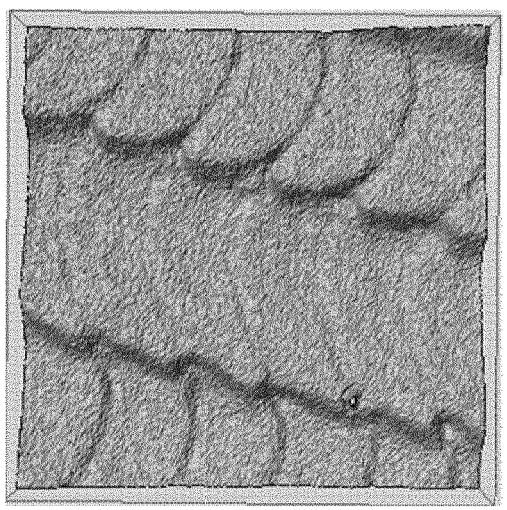
FIGS. 8(*a*) and 8(*b*) are surface profiles produced by an in focus laser ablation process and an out of focus laser ablation process, respectively.
Figure 8A:
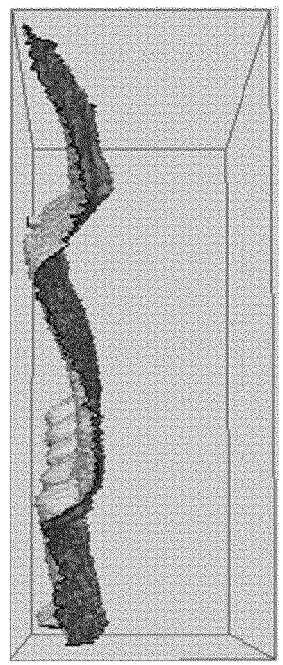
Figure 8B:
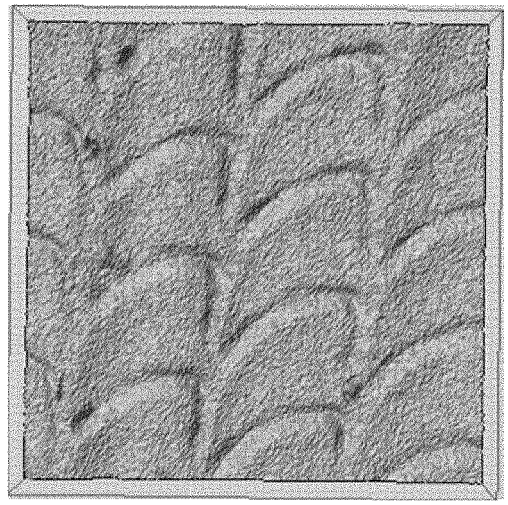
Figure 8B:
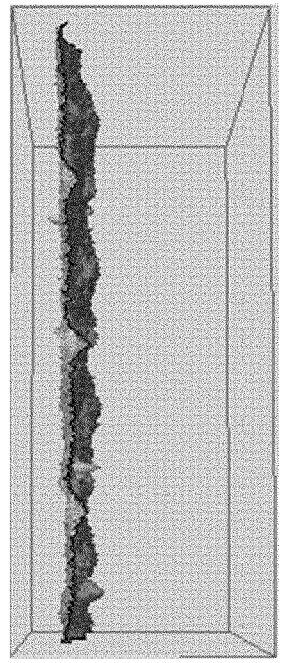

The effect of a reduced surface damage ablation process is illustrated in FIGS. 8(a) and 8(b), which show the surface profiles of an in focus laser ablation process and an out of focus laser ablation process, respectively. As demonstrated by FIGS. 8(a) and 8(b), the out of focus process produces a surface profile with significantly less damage than the in focus process. For example, the depth of the damage of the surface is significantly reduced by employing the out of focus process. The reduction in the surface damage depth produces a less objectionable diffraction effect.

Another method of reducing the diffraction pattern produced by a laser ablated surface includes modifying the laser ablation method such that the produced artifacts are arranged in an irregular surface structure. In one implementation of this method, the spacing among adjacent laser spots may be random or pseudo-random. Pseudo-random refers to a structure in which on short length scales, the surface feature spacing is not constant, but may have some periodic nature at larger length scales.

One way to achieve such irregular feature spacing includes wiggling, vibrating, or otherwise causing the beam to deviate from the periodic spacing associated with the constant pulse frequency and scan speed of the ablation system. This deviation may be accomplished without changing the pulse frequency or the scan speed. In one embodiment, the laser system may be equipped with an actuated mirror or other actuated optical element, such as a mirror mounted on a voice coil or piezoelectric driver. A piezoelectric driver has the advantage of being able to drive the deviation of the feature spacing at a very high frequency. In one non-limiting example, an actuated mirror is placed in or along the beam path of a laser pulsed at 400 kHz and swept at 20 m/s. As described above, this particular combination of pulse frequency and scan speed results in a pulse-to-pulse spacing of 50 μm in the scan direction when no deviation is introduced. The mirror, when actuated at some frequency and associated amplitude, causes deviations in the beam path that produce a non-constant pulse spacing. The mirror in the beam path may be actuated at 40 kHz in such a manner that the spot at the work piece is deviated back and forth within a 20 μm range, with the movement aligned with the direction of scanning. The resulting spacing of the laser spots in this example will vary between 62.6 μm and 37.4 μm through each cycle of the actuated mirror. At 40 kHz and 20 m/s the cycle of the actuated mirror is 25 μs which yields 500 μm of beam travel. Such an actuated mirror may be physically displaced to offset the beam while keeping it parallel to the ablation path. This makes the distance of the actuated mirror from the work piece unimportant. Alternatively, the mirror may be tilted by the actuator, producing a deflection that scales with the distance of the actuated mirror from the work piece. For actuators with small deflection at high frequency, the tilting approach may be preferred since the deflection is magnified as the distance to the work piece is increased.

The pulse spacing, and thereby the distance between the artifacts produced on the surface by the ablation process, may be varied within any appropriate range. In one embodiment, the spacing between the produced artifacts on the surface may vary between 20 μm and 80 μm, such as between 30 μm and 70 μm, or between 35 μm and 65 μm. The spacing between individual artifacts on the surface is non-constant, such that the spacing between sequential artifacts is different in the scan direction.

Another method of forming irregular surface structures includes varying the extracted pulse frequency of the laser. A given laser may have an internal pulse frequency, and an internal electro-optic modulator (EOM) or similar device may be employed to extract pulses at a desired external pulse frequency. For example, an internal EOM may be used to extract pulses at an external pulse frequency of 400 kHz from a laser having an internal pulse frequency of 50 MHz by extracting every $125^{th}$ pulse with the internal EOM. This extraction frequency may be varied to produce different output frequencies. One limitation of this output frequency control technique is that the possible extraction frequencies are quantized into single pulses of the primary laser, such as increments of 50 MHz (20 ns). For operation of a 50 MHz laser in an output range of 400 kHz this may be especially limiting. For example, generating variable pulse spacing in a range from 40 μm to 50 μm at a 20 m/s scan speed is achieved by varying the output frequency between 400 kHz and 500 kHz, which in turn requires varying the number of internal (50 MHz, 20 ns) pulses between extracted pulses from 100 (500 kHz) to 125 (400 kHz). To vary from 400 to 500 kHz in single 20 ns steps requires 51 steps to complete the cycle, which requires a total elapsed time of 115 μs, corresponding to 2.3 mm of travel at a scan speed of 20 m/s. Larger steps can be employed to reduce the cycle time and increase the distance change from pulse to pulse.

The output frequency of the laser may be varied in any appropriate range. In one embodiment, the output frequency of the laser may be varied between 300 kHz and 600 kHz, such as between 350 kHz and 550 kHz, 400 kHz and 500 kHz, or 425 kHz and 475 kHz. The scan speed and frequency variation range may be adjusted to select a desired distance over which the entire range of variation in pulse spacing is achieved. The scan speed may be any appropriate speed. The scan speed may also be varied during the ablation process, such as from line to line, to vary the distance between the pulses. According to one embodiment the scan speed may be in the range of, or vary within the range of, 10 m/s to 80 m/s, such as 20 m/s to 70 m/s, or 40 m/s to 60 m/s.

Another method of forming irregular surface structures includes varying the size of the ablation spot at high frequency. Such variation in the size of the ablation spot may be achieved by employing a variable lens in the laser ablation system, such as a liquid lens. Such a variable lens may be modulated in any appropriate manner, such as employing piezoelectric drivers that operate at a selected frequency and/or associated amplitude. The divergence of the beam is modified by the modulation of the variable lens, which then modulates the focal length of the system. In such a system, the working distance from the lens to the surface to be ablated may be held constant, such that changing the focal length produces a change in the distance from the focal plane to the surface to be ablated and thereby changes the laser spot size at the surface to be ablated. As the ablated spot size changes, the distance between adjacent ablation and resulting surface features is changed. Variations in the ablation spot size may be also be achieved by varying the pulse energy during the scanning process. Such a variation in the pulse energy may be employed in place of, or together with, a variable lens system.

Another method of producing an irregular surface structure is to vary the scan pitch, such that the line to line spacing of the surface structure is varied. The pitch between adjacent lines may be altered to break the symmetry of the surface structure in the pitch direction. The pitch may vary within any appropriate range. According to one embodiment, the pitch spacing may vary within a range of 60 μm to 200 μm, such as within a range of 70 μm to 175 μm, 80 μm to 150 μm, or 90 μm to 125 μm. In a similar manner, the scan speed may be altered line to line to generate different pulse spacing on subsequent lines. The pulse spacing of adjacent lines in the surface structure may have the same pulse spacing pattern, such that the pulses in adjacent lines are aligned but spacing between the pulses within each line is irregular. Altering the surface damage symmetry on these short size scales has the effect of blurring the diffraction which can make it less objectionable to an observer. The pitch spacing variation range and the pulse spacing variation range may be limited to preserve a desired overlap between pulses, with the overlap between pulses ensuring that the material to be removed in the ablation process is sufficiently removed.

Another method of controlling repeat patterns in the ablated surface in order to minimize diffraction artifacts is to utilize pulse synchronization. Such a process includes controlling the location of the first pulse of each sweep by timing the start of the sweep to coincide with a laser pulse. This approach enables the control of the phase relationship between subsequent lines of pulses. Pulses may be controlled to produce a cubic arrangement, where the pulses in adjacent lines are aligned with each other (in phase), or a hexagonal packing, where the pulses in adjacent lines are not aligned (out of phase). Using this method the phase relationship of subsequent lines can be altered to minimize any apparent diffraction artifacts. The phase relationship of the pulses may be controlled such that every other line of the surface structure is aligned, such as in an ABAB pulse spacing arrangement, where A and B refer to pulse spacing alignments. Any other appropriate pulse spacing arrangement alignment from line to line may also be employed. Changing the relative position and spacing of neighboring pulses changes the relative locations of the resulting diffraction artifacts and also can affect the perceived intensity of the diffraction artifacts.

Another method of reducing the perceived intensity of diffraction artifacts is to modify the pulse to pulse and line pitch spacing so that they are similar or essentially identical. Such a process produces a substantially symmetrical surface structure, as described above. This method, in combination with the phase control described above, produces well defined grid-like arrays of diffraction artifacts that, due ostensibly to the increased separation of diffraction spots, reduce the overall intensity of the individual spots. Such a reduction in the diffraction spot intensity may produce an overall diffraction pattern that is less noticeable, and thereby not objectionable.

Figure 9:
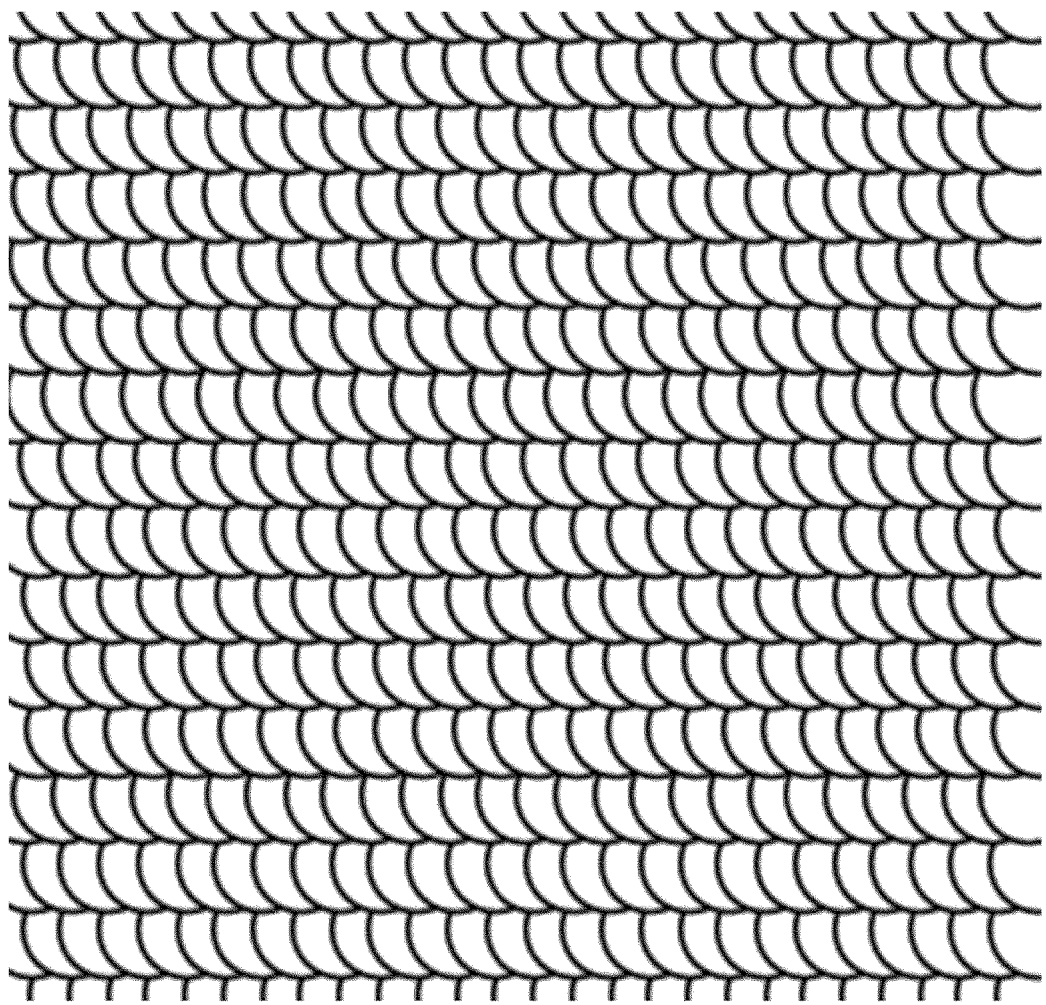
FIG. 9 is a schematic representation of a surface damage structure produced by a laser ablation process with a constant speed of 30 m/s, a pitch of 130 µm, and no output synchronization.
Figure 10:
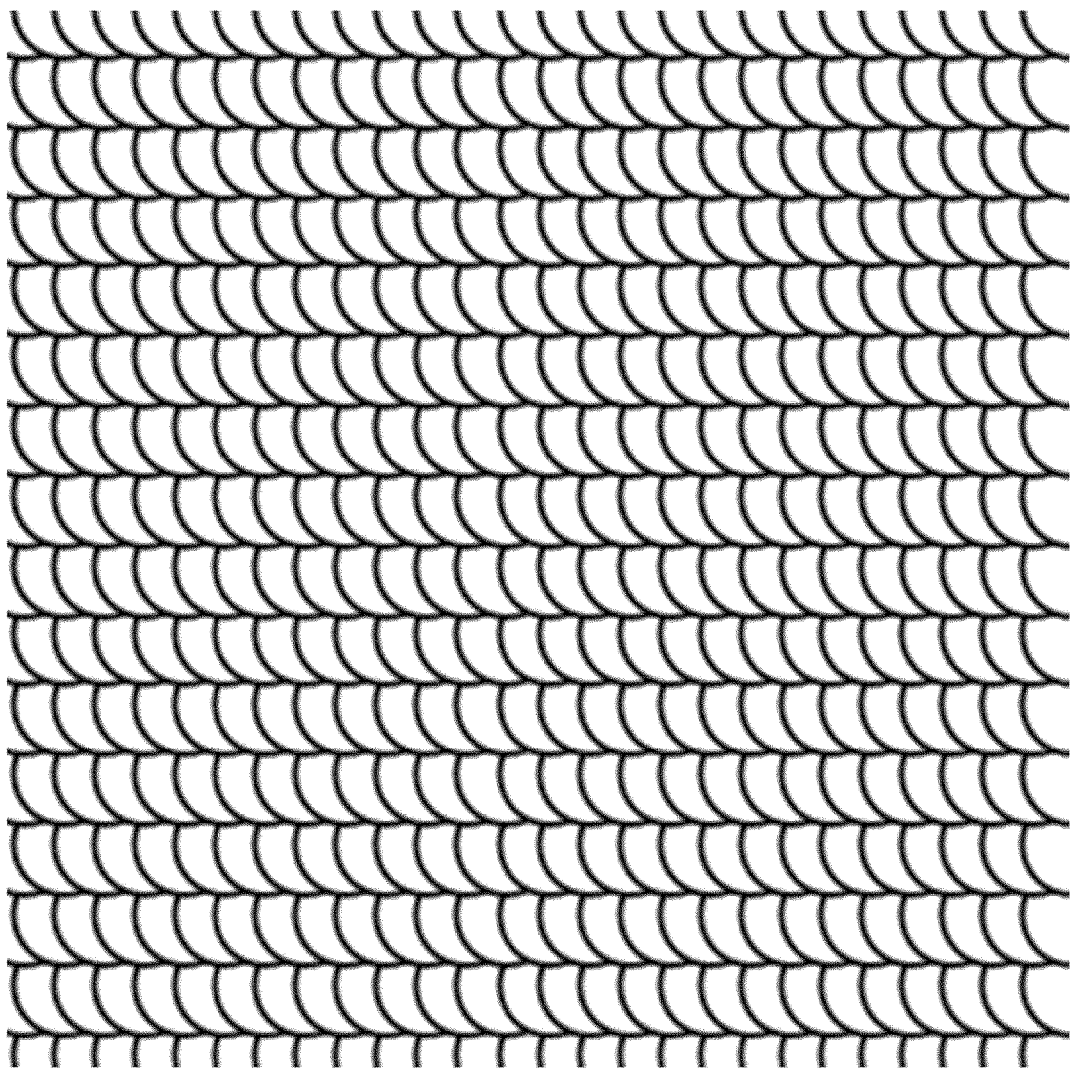
FIG. 10 is a schematic representation of a surface damage structure produced by a laser ablation process with a constant speed of 30 m/s, a pitch of 130 µm, and output synchronization to produce a square packing alignment.
Figure 11:
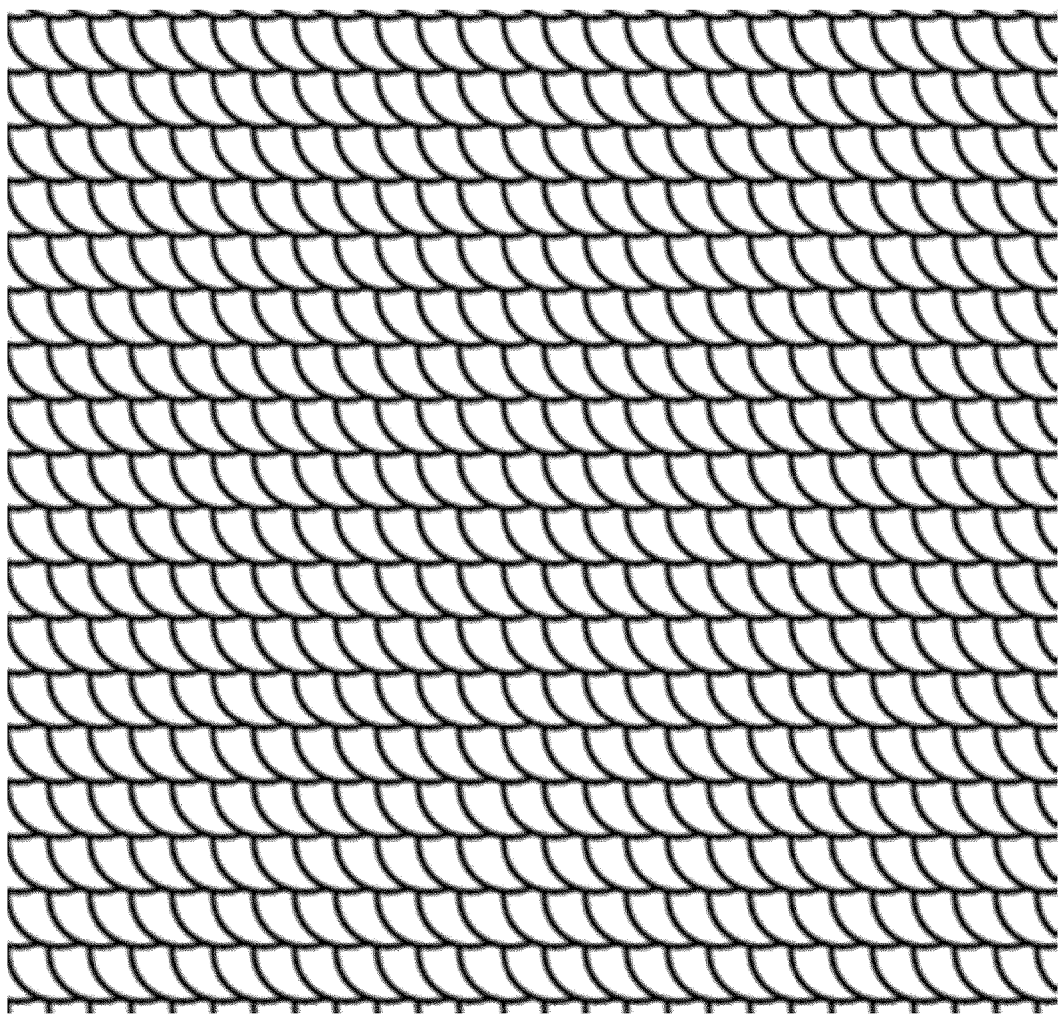
FIG. 11 is a schematic representation of a surface damage structure produced by a laser ablation process with a constant speed of 40 m/s, a pitch of 100 µm, and output synchronization to produce a square packing alignment.
Figure 12:
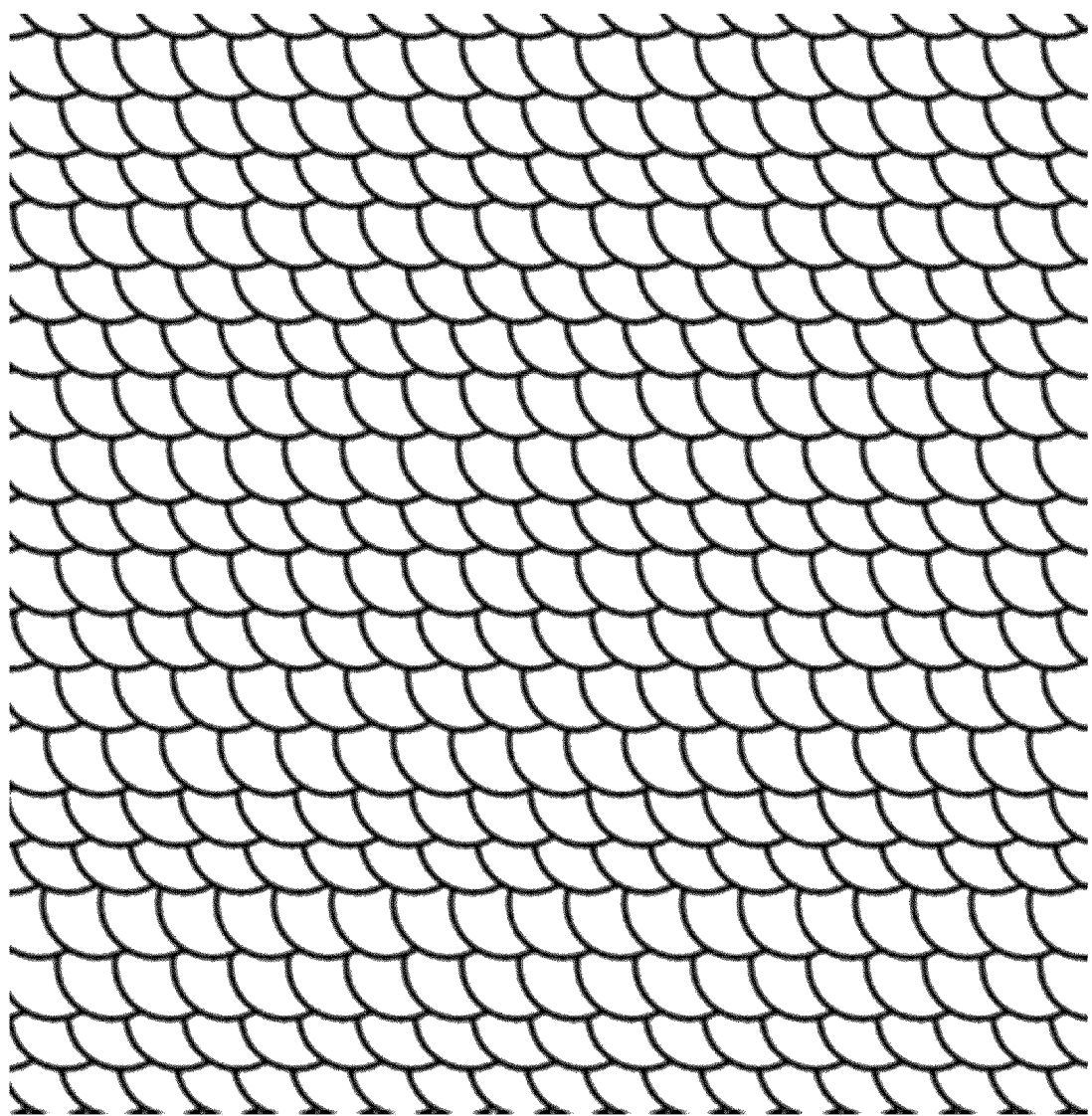
FIG. 12 is a schematic representation of a surface damage structure produced by a laser ablation process with a constant speed of 40 m/s and a random pitch in the range of 80-120 µm.
Figure 13:
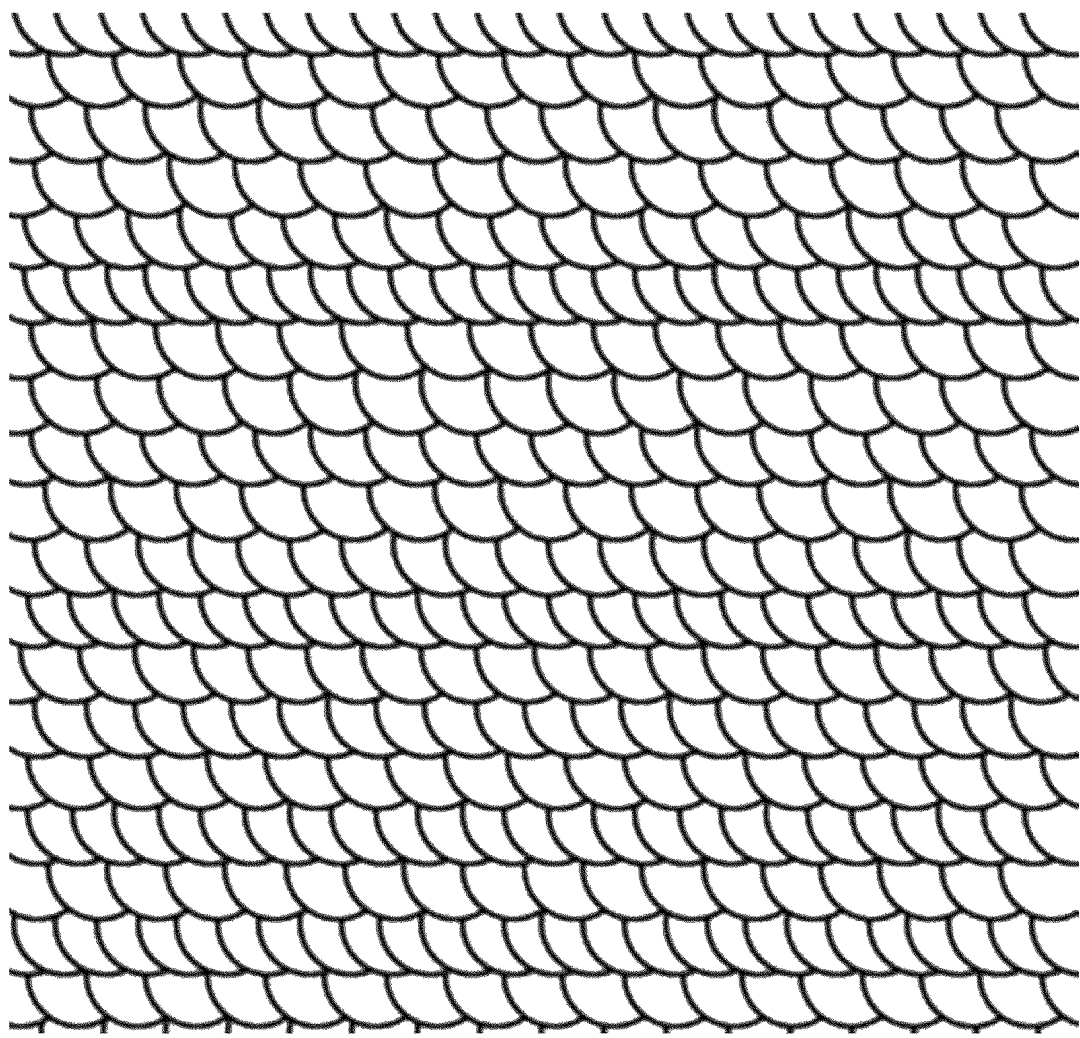
FIG. 13 is a schematic representation of a surface damage structure produced by a laser ablation process with a random speed in the range of 30-50 m/s and a constant pitch of 100 µm.
Figure 14:
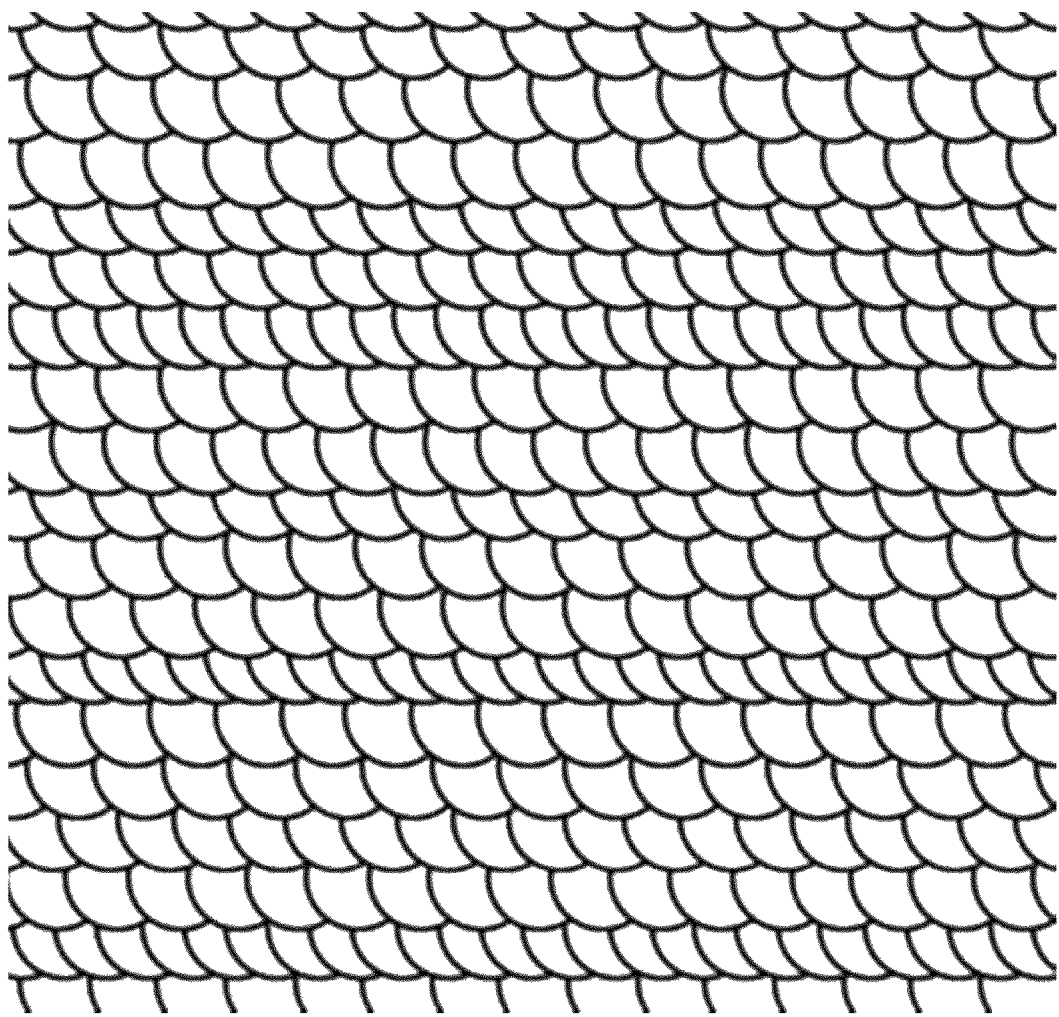
FIG. 14 is a schematic representation of a surface damage structure produced by a laser ablation process with a random speed in the range of 30-50 m/s and a random pitch in the range of 80-120 µm.

Exemplary surface damage structures are illustrated in FIGS. 9-14. FIG. 9 is the surface damage structure produced by a laser ablation process with a constant speed of 30 m/s, a pitch of 130 µm, and no output synchronization. FIG. 10 is the surface damage structure produced by a laser ablation process with a constant speed of 30 m/s, a pitch of 130 µm, and output synchronization to produce a square packing alignment. FIG. 11 is the surface damage structure produced by a laser ablation process with a constant speed of 40 m/s, a pitch of 100 µm, and output synchronization to produce a square packing alignment. FIG. 12 is the surface damage structure produced by a laser ablation process with a constant speed of 40 m/s and a random pitch in the range of 80-120 µm. FIG. 13 is the surface damage structure produced by a laser ablation process with a random speed in the range of 30-50 m/s and a constant pitch of 100 µm. FIG. 14 is the surface damage structure produced by a laser ablation process with a random speed in the range of 30-50 m/s and a random pitch in the range of 80-120 µm. As shown in these figures, introducing randomness in the speed or pitch of the process produces an irregular surface structure. Additionally, the speed and pitch of the process directly influences the spacing and pitch of the artifacts produced on the surface. Additionally, output synchronization allows a desired row to row alignment, such as square packing, to be achieved.

The methods described herein for reducing the appearance of diffraction patterns associated with a laser ablation process may be applied to any appropriate laser ablation process known in the art. For example, the methods described herein may be applied to the second surface laser ablation process described in U.S. patent application Ser. No. 14/874,263 filed on Oct. 2, 2015, the entirety of which is incorporated herein by reference, for any and all purposes. A second surface laser ablation process is a process in which the laser beam utilized to remove material from a surface passes through the surface before the laser beam impinges on the material to be removed.

A method of quantifying the severity of the diffraction effect was developed. In some cases, the diffraction effect is not present at all, which may be preferable. In other cases, the diffraction effect may be present but with a severity that is not objectionable. Lighting conditions and environmental factors can contribute to whether the effect is noticeable in real world conditions and whether it is objectionable.

Figure 15:
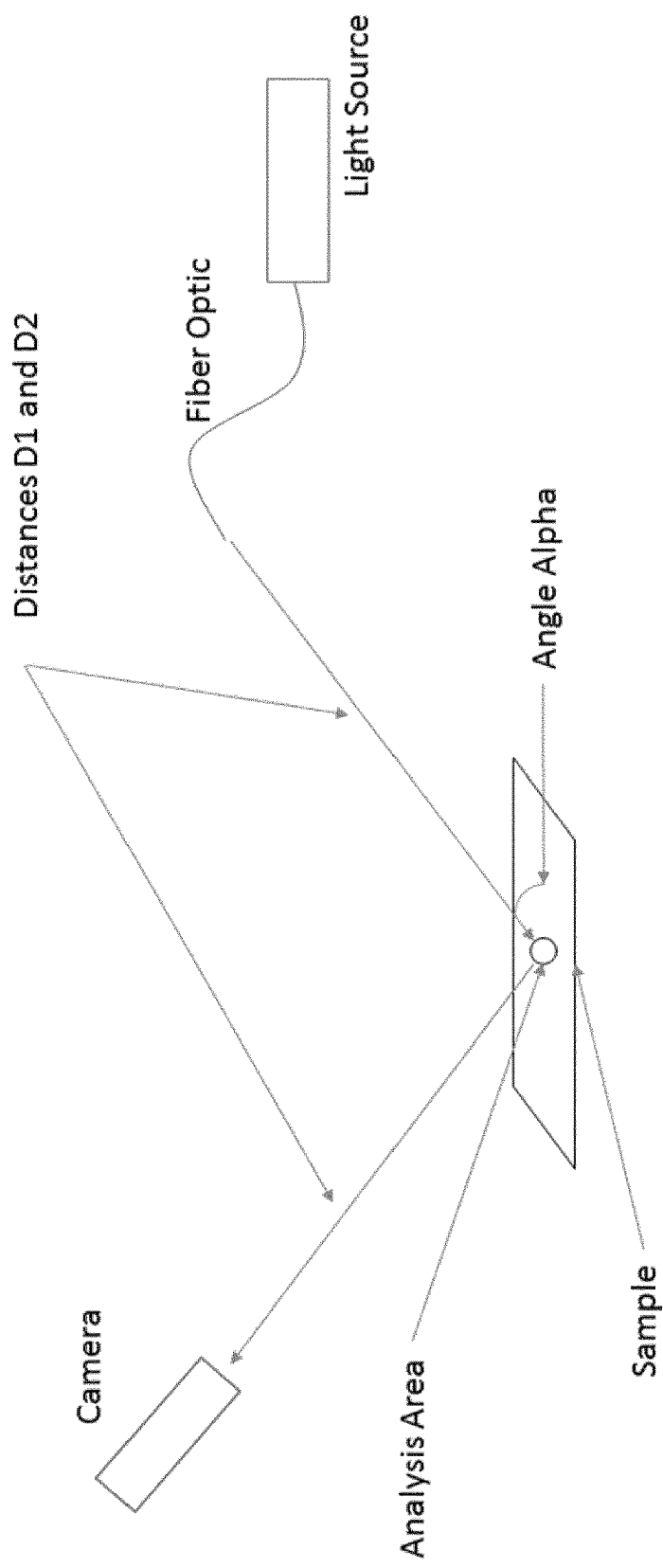
FIG. 15 is a schematic representation of a laboratory apparatus for quantifying a diffraction effect.
Figure 16:
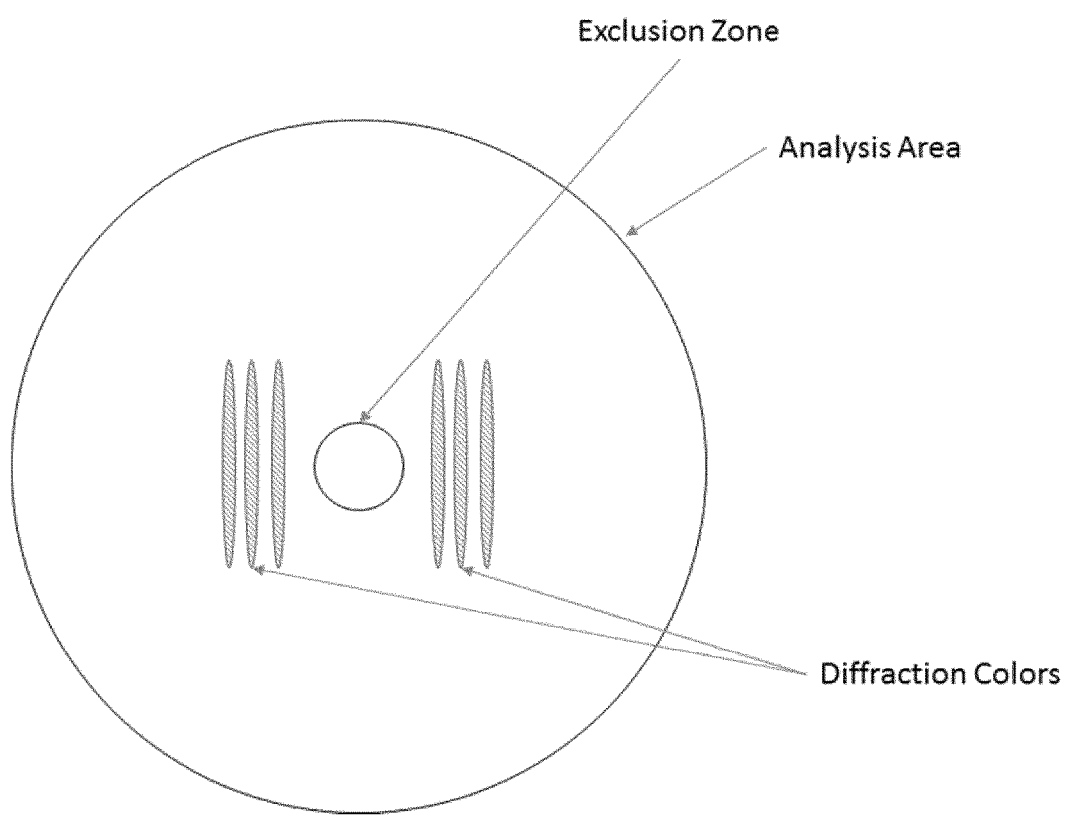
FIG. 16 is a schematic depicting a diffraction pattern that includes an appropriate exclusion zone and analysis area for determining a diffraction severity.
Figure 17:
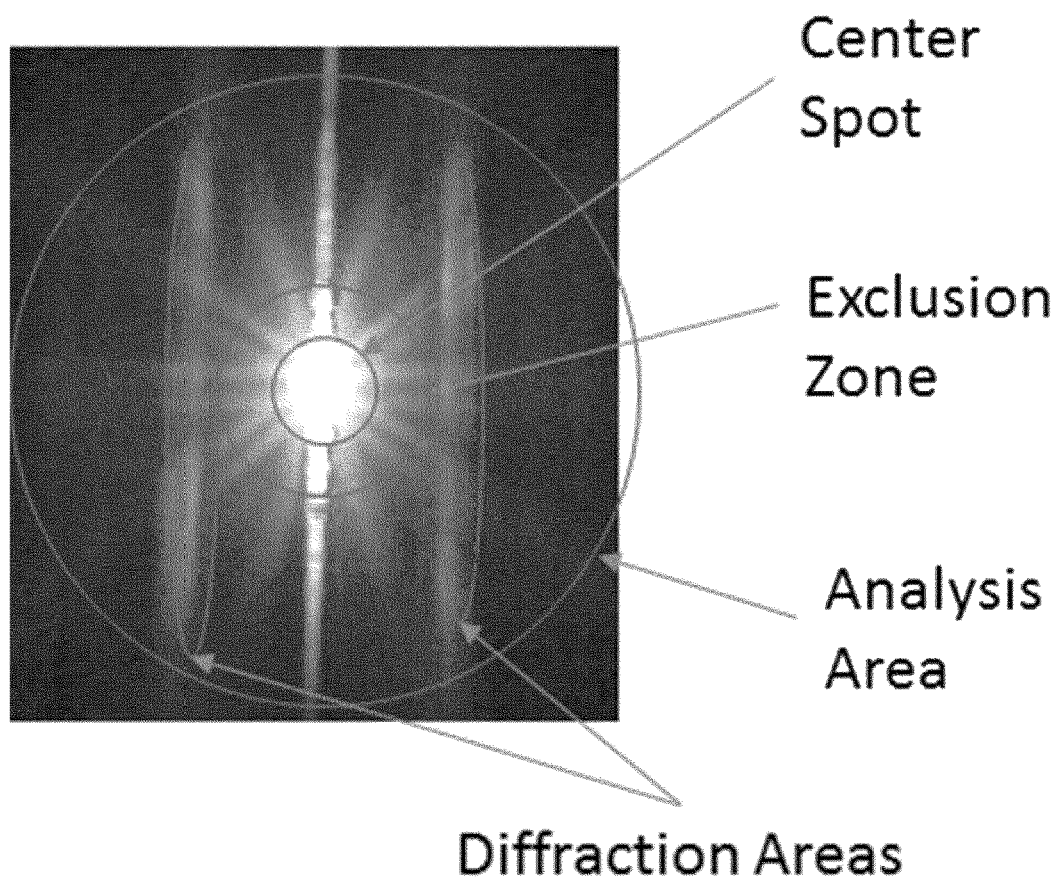
FIG. 17 is a camera image of a diffraction pattern that includes an appropriate exclusion zone and analysis area for determining a diffraction severity.

A laboratory apparatus for measuring the diffraction effect includes a point light source, such as an optical fiber with a light-emitting end. FIG. 15 depicts the laboratory apparatus. The measurements are taken in a darkened room to minimize errors introduced by stray light. The light is projected toward the surface to be evaluated at a selected angle. A color camera is located at the complementary angle to the surface and images the result. The light detected by the camera is then separated into the principle colors, and a software algorithm analyzes the image to determine an ellipse that can encompass the reflected image and define the analysis area. The analysis area is shown in FIGS. 16 and 17. The analysis area may scale with the severity of the diffraction effect wherein a more severe diffraction effect has a larger analysis area. The area is analyzed and yellow light is subtracted from the image. The red, blue and green intensities are then summed and normalized to the analysis area. This then gives a quantitative metric for the severity of the diffraction effect which may be referred to as diffraction severity, where higher values for diffraction severity indicate a more severe, noticeable, and/or visually objectionable diffraction effect and lower values indicate a less severe, noticeable, and/or visually objectionable effect.

The light source is provided by Ocean Optics, model "Blue Loop," and feeds light into a 600 micron fiber optic. The light is directed from the end of the fiber toward a sample at an angle alpha of 35 degrees measured from the plane of the sample. The end of the fiber is positioned at a distance D1, 17", from the sample and approximates a point light source. The illumination area is approximately 180 square centimeters. The illumination area should be large enough that the illumination makes little to no contribution to the image intensity. If the fiber is too close to the part, brighter background noise from the illumination cone is picked up rather than just the bright spot imaged on the fiber. A camera is positioned at distance D2, 17", from the sample at a comparable angle Alpha. The camera was a Basler model AC2500-14UC with an f1.8 aperture. The lens was a 50 mm Fujinon lens, model # HF50SA-1. The focus of the lens is adjusted such that the focal plane of the camera is at the end of the fiber.

The camera inspection employs a static exposure. The integration time needs is selected to be short enough so that none of the Red, Green or Blue colors are saturated, and long enough so that the diffraction colors are perceptible above the noise level of the measurements. The difference between these two integration times defines the working integration time. The integration may be set half way between the two values. For the light source and camera employed, the exposure time was set to approximately 50 milliseconds.

The camera is calibrated to a spectralon plaque in order attain proper white balance. The Red, Green and Blue gains are adjusted as necessary for proper color of the spectralon plaque.

The camera image of the analysis is shown in FIG. 17. The image is broken down into two regions—an exclusion zone and an analysis area as illustrated in the schematic shown in FIG. 16 and the annotated camera image in FIG. 17. The diameter of each area is based on the size of the bright light source in the center of the image. The diameter is measured for the center bright spot and the exclusion zone is concentric with the bright spot and has twice (2×) the bright spot diameter. The outer circle defines the total analysis area and is six times (6×) the diameter of the center bright spot. The analysis image is evaluated for vertical color diffraction bands on both sides of the center bright spot in the region between the exclusion circle and the 6× diameter circle.

The color area is then examined for regions which are comprised essentially of either Red, Blue or Green light. These regions define the diffraction bands. The area calculated for each of these colors is then summed and the summed area is divided by the total analysis area to produce a unit-less percentage number associated with the diffraction effect.

As the magnitude of diffraction effect increases and decreases the area the Red, Blue and Green zones change proportionally. The number of diffraction zones may increase or the width and length of the zones may change as the magnitude of the effect varies. The measurement is relatively insensitive to the integration time. For example, the resultant diffraction numbers may change by only about +/−5% with approximately +/−25% of the working integration time.

Visual examinations of parts along with measurements were used to determine a threshold diffraction value which corresponds to no visually discernible diffraction effect. This threshold value may vary with the type of sample analyzed, and may be affected by different coatings present on the surface. Below the threshold limit the measured values may vary but may indicate only different types of noise for the sample and/or the system.

The measured diffraction severity values may be correlated to a subjective objectionability by a particular observer or group of observers, type of light, angle of view, relative and absolute distances between an observer and the ablated surface and the light source, and/or other variables so that diffraction severity values obtained under a set of standardized conditions can be used to identify an acceptable threshold value. The measured diffraction severity values can also be used to evaluate changes in the severity of the diffraction effect for experimental purposes.

Figure 18:
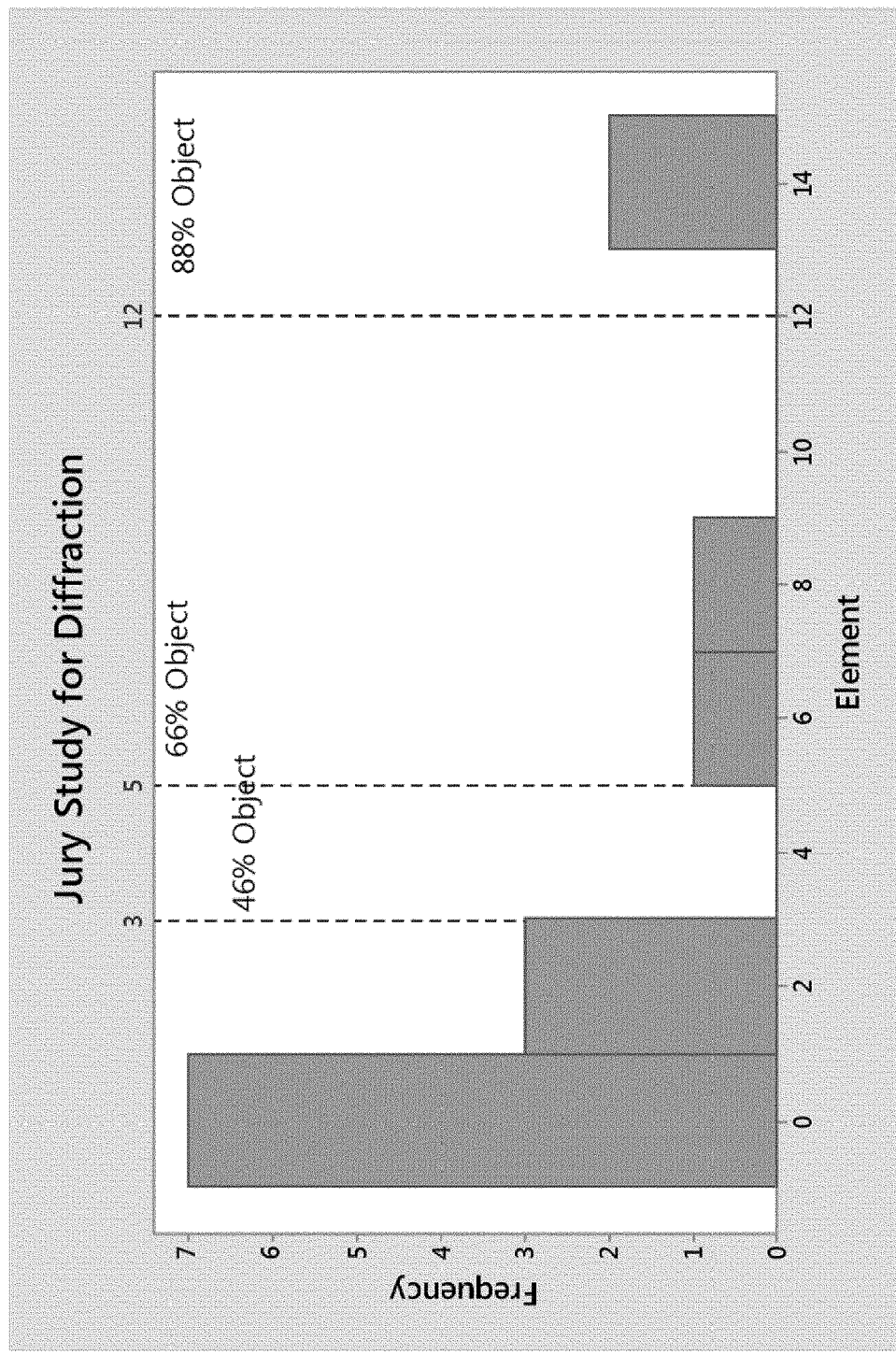
FIG. 18 shows the results of a study of the objectionability of diffraction effects based on the measurement of diffraction severity.

The measured diffraction severity values generated using this technique were used to select a range of electrochromic mirror samples with different diffraction severity levels. The samples were reviewed in laboratory and driving conditions, and subjectively ranked and to determine threshold values. The age of the observer, vehicle type and drive route all affected the rankings. Twenty-seven participants reviewed a series of mirrors with varying diffraction ratings. The number of parts (frequency) versus diffraction rating which was used for the study is shown below. When the diffraction severity was above about 12, 88% of the participants objected to the effect while only 66% of the participants objected when the diffraction severity was above about 5. When the diffraction severity was about 3, 46% of the participants objected to the effect. When the diffraction severity was less than about 2, only 19% of the participants found the effect to be objectionable. In order for about half of the participants to consider the effect acceptable the diffraction severity value should be below about 5. The results of the study are shown in FIG. 18.

The diffraction severity may be less than about 5, preferably less than about 2.5, and most preferably less than about 1.5. The visibility of the diffraction effect under the most stringent lighting conditions starts at a diffraction severity of about 0.7 to 1.0.

Another aspect of the invention is an electrochromic assembly, such as a vehicle rearview mirror assembly, produced by any of the above described methods.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "having," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

The invention claimed is:

1. A method for removing a material from a surface, the method comprising:
   passing a laser through a lens such that the laser impinges on the material;
   wherein the surface from which the material is removed has an array of artifacts thereon with a spacing between centers of successive artifacts and a pitch between lines of the artifacts; and
   wherein at least the spacing between the centers of the successive artifacts is varied.

2. The method of claim 1, wherein at least the spacing between the artifacts is varied by varying a pulse frequency of the laser such that a variation in a spacing of laser pulses incident on the material is produced.

3. The method of claim 1, wherein at least the spacing between the artifacts is varied by varying a scan speed of the laser over the material such that a variation in a spacing of laser pulses incident on the material is produced.

4. The method of claim 1, wherein at least the spacing between the artifacts is varied by driving an actuated mirror located along a beam path of the laser such that a variation in a spacing of laser pulses incident on the material is produced.

5. The method of claim 1, wherein successively spaced artifacts at least partially overlap each other.

6. The method of claim 1, wherein at least the spacing between the artifacts is varied and the pitch between lines of the artifacts is not varied.

7. The method of claim 1, wherein the pitch between lines of the artifacts is varied.

8. The method of claim 7, wherein adjacent lines of artifacts at least partially overlap each other.

9. The method of claim 1, wherein at least one of the spacing and the pitch is random or pseudo-random.

10. The method of claim 1, wherein the artifacts each have a characteristic radii, and at least a portion of the artifacts have different characteristic radii.

11. The method of claim 1, wherein a working distance between the lens and the material is different than a focal length of the lens, and wherein a focal plane of the laser is located beyond the surface in a direction of propagation of the laser.

12. The method of claim 1, wherein the lens is a variable lens, and further comprising modulating a focal length of the lens.

13. The method of claim 1, wherein the material is disposed on a second surface of a substrate opposite a first surface of the substrate, and wherein the laser passes through the first surface, the substrate, and the second surface before impinging on the material to be removed.

14. The method of claim 1, wherein the surface from which the material is removed does not exhibit an objectionable diffraction effect after the material has been removed.

15. The method of claim 1, wherein the surface from which the material is removed exhibits a diffraction severity of less than 5 after the material has been removed.

16. A product comprising:
   a substrate having:
      a first surface; and
      an opposing second surface having an array of artifacts thereon with a spacing between the artifacts and a pitch between lines of the artifacts;
   wherein at least one of the spacing between the artifacts or the pitch between the lines of the artifacts varies;
   wherein successively spaced artifacts at least partially overlap each other; and
   wherein adjacent lines of the artifacts at least partially overlap each other.

17. The product of claim 16, wherein the array of artifacts are the result of a laser ablation process that removes a material from the opposing second surface.

18. The product of claim 16, wherein the product is an electrochromic assembly.

19. A method for removing a material from a substrate, the method comprising:
   providing the substrate having a first surface and an opposing second surface, wherein the material is disposed on the opposing second surface of the substrate; and
   impinging a laser on the material to remove the material from the substrate, wherein the laser passes through the first surface and the opposing second surface before impinging on the material;
   wherein the opposing second surface from which the material is removed has an array of artifacts thereon with a spacing between the artifacts and a pitch between lines of the artifacts; and
   wherein a first spacing between first artifacts of a first line of artifacts of the lines of artifacts is different than a second spacing between second artifacts of a second line of artifacts of the lines of artifacts.

20. The method of claim 19, wherein a first pitch between the first line of artifacts and the second line of artifacts is different than a second pitch between the second line of artifacts and a third line of artifacts of the lines of artifacts.

* * * * *